US010853049B2

(12) United States Patent
Groseclose et al.

(10) Patent No.: US 10,853,049 B2
(45) Date of Patent: Dec. 1, 2020

(54) METHODS FOR ENABLING A COMPUTER TO MIGRATE MICROSERVICES AND TO PERFORM MICROSERVICE TEMPLATING

(71) Applicant: ADP, LLC, Roseland, NJ (US)

(72) Inventors: Joe Groseclose, New York, NY (US);
Lohit J. Sarma, New York, NY (US);
Darshan Kapadia, New York, NY (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 15/829,790

(22) Filed: Dec. 1, 2017

(65) Prior Publication Data

US 2019/0171433 A1 Jun. 6, 2019

(51) Int. Cl.
*G06F 9/44* (2018.01)
*G06F 8/65* (2018.01)
*G06F 8/76* (2018.01)

(52) U.S. Cl.
CPC . *G06F 8/65* (2013.01); *G06F 8/76* (2013.01)

(58) Field of Classification Search
CPC .......................................................... G06F 8/65
See application file for complete search history.

(56) References Cited

U.S. PATENT DOCUMENTS

| 5,960,200 | A * | 9/1999 | Eager | G06F 8/427 |
| | | | | 703/13 |
| 9,361,092 | B1 * | 6/2016 | Bai | G06F 8/65 |
| 9,535,664 | B1 * | 1/2017 | Foster | G06F 8/427 |
| 2003/0225927 | A1 * | 12/2003 | Goodman | G06F 9/44505 |
| | | | | 719/320 |
| 2008/0115123 | A1 * | 5/2008 | Kelly | G06F 11/0748 |
| | | | | 717/177 |
| 2010/0125618 | A1 | 5/2010 | Dutta et al. | |
| 2012/0110093 | A1 | 5/2012 | Tingstrom et al. | |
| 2013/0091099 | A1 * | 4/2013 | Novak | G06F 8/76 |
| | | | | 707/661 |
| 2013/0125107 | A1 * | 5/2013 | Bandakka | G06F 11/1417 |
| | | | | 717/171 |
| 2014/0047429 | A1 | 2/2014 | Gaither et al. | |
| 2014/0075426 | A1 | 3/2014 | West et al. | |
| 2015/0324227 | A1 * | 11/2015 | Sizemore | G06F 9/48 |
| | | | | 718/1 |
| 2017/0124073 | A1 * | 5/2017 | McKenzie | H04L 67/06 |
| 2019/0347095 | A1 * | 11/2019 | Adams | G06F 8/60 |

OTHER PUBLICATIONS

Nolle (Web article: Why SOA applications are easy to migrate to cloud, dated Feb. 7, 2013; retrieved on Jun. 4, 2019; URL:https://searchmicroservices.techtarget.com/tip/Why-SOA-applications-are-easy-to-migrate-to-cloud?vgnextfmt=print).*

* cited by examiner

*Primary Examiner* — Hang Pan
(74) *Attorney, Agent, or Firm* — Yee & Associates, P.C.

(57) ABSTRACT

Enabling migration of code in a service oriented architecture executed in a distributed computing environment. A migration definition for generating migrations is received, the migration definition exposing a tangible set of matchers and filters configured to locate code constructs and codebase settings of the code to be migrated. The code to be migrated is user defined. A deterministic script is scaffolded from the tangible set of matchers and filters to find instances of code to update or settings to update within the distributed environment. The instances of the code settings are updated, whereby the code in the service oriented architecture is migrated.

21 Claims, 3 Drawing Sheets

METHODS FOR ENABLING A COMPUTER TO MIGRATE MICROSERVICES AND TO PERFORM MICROSERVICE TEMPLATING

BACKGROUND INFORMATION

1. Field

The present disclosure relates to methods for enabling a computer to migrate microservices and to perform microservice templating.

2. Background

The concept of database migration is known. Database migration is the process of transferring databases between storage types, formats, or computer systems. Database migration is typically performed using programs or scripts to automate the transfer of data. Database migration is an important aspect for any system implementation, upgrade, or consolidation that inherently depends on the maintenance of stateful data.

However, database migration does not migrate code constructs or microservices. Microservices are a type of a service oriented architecture (SOA) used to build distributed software systems. Microservices communicate with each other in order to fulfill a goal, and because of this requirement for specified communication, microservices cannot be migrated automatically today. In other words, microservice and code construct migration cannot be automated because the underlying architecture for doing so does not exist. Thus, methods are needed for enabling a computer to do what it could not do before: migrate code constructs and microservices, and to perform microservice templating.

SUMMARY

The illustrative embodiments provide for a computer implemented method of enabling migration of code in a service oriented architecture executed in a distributed computing environment. The computer-implemented method includes receiving, using a processor, a migration definition for generating migrations, the migration definition exposing a tangible set of matchers and filters configured to locate code constructs and codebase settings of the code to be migrated. The code to be migrated is user defined. The method also includes scaffolding, using the processor, a deterministic script from the tangible set of matchers and filters to find instances of code to update or settings to update within the distributed environment. The method also includes updating, using the processor, the instances of the code or updating the settings, whereby the code in the service oriented architecture is migrated.

The illustrative embodiments also contemplate a computer programmed to perform this computer-implemented method. The illustrative embodiments also contemplate a non-transitory computer-recordable storage medium storing program code which, when executed by a processor, performs the computer-implemented method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
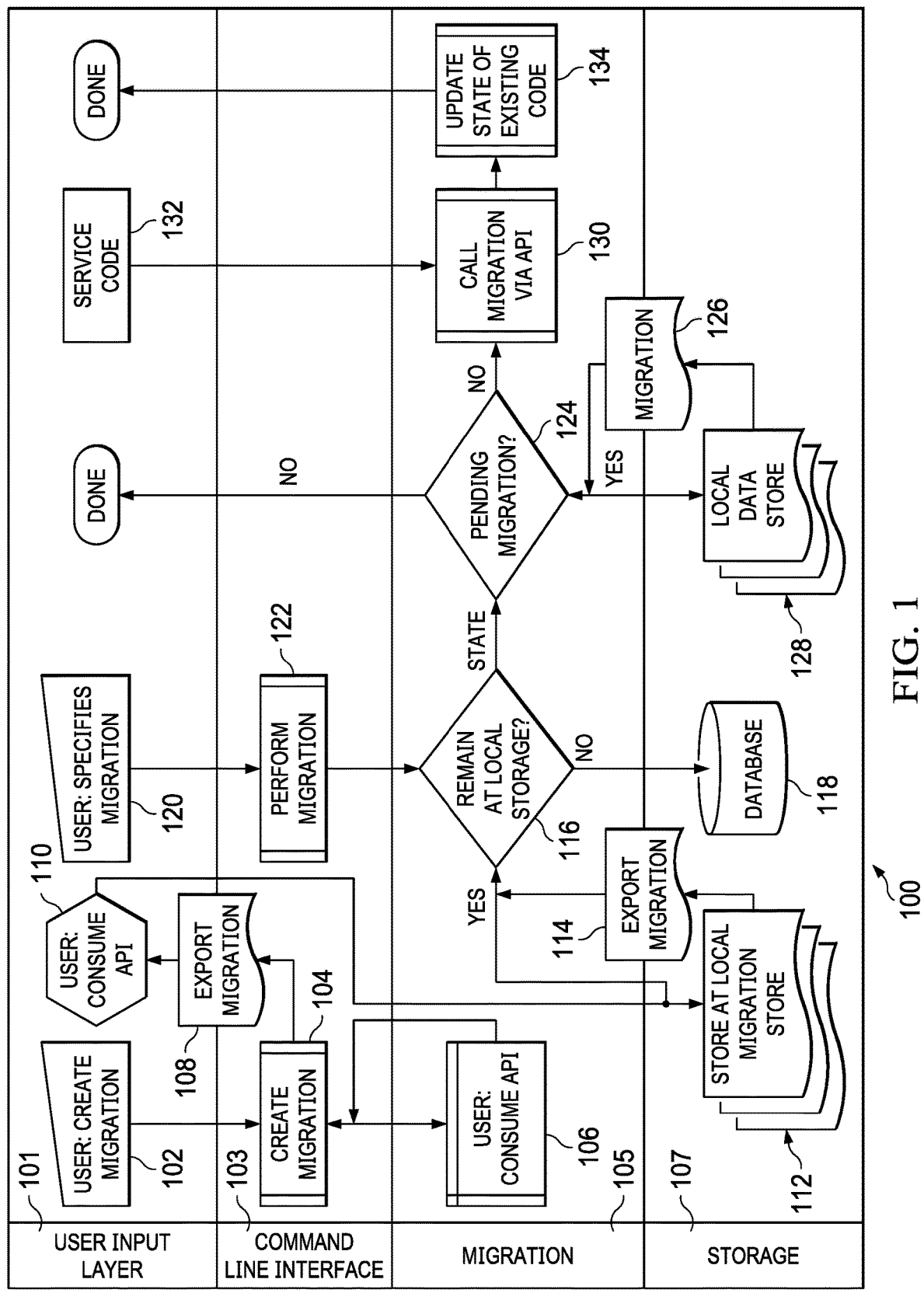
FIG. 1 is an illustration of a flowchart of a method for enabling a computer to migrate microservices and to perform microservice templating, in accordance with an illustrative embodiment.

The illustrative embodiments recognize and take into account that database migration is known in terms of the expected norm of stateful database clients. Likewise, microservices and service oriented architectures are known. However, the illustrative embodiments also recognize and take into account that computers currently cannot migrate code constructs because the underlying architecture is not present. This fact somewhat also bears the assumption that the microservices are built in such a way that they can utilize the same set of underlying tools or at least built using the same programming language or a programming language that has a similar underlying parsed abstract syntax tree structure. This arrangement is more often than not the case.

Therefore, the illustrative embodiments provide the underlying architecture to apply the concept of migration to code constructs, thereby allowing any codebase or microservice to consume updates maintained in a centralized repository and independently track their own upgraded state. In this manner, the illustrative embodiments bring to microservices a paradigm of hive-mindedness, or assimilation, that is subscribing to a centralized governance model, which is not currently an attribute of any existing microservice systems. At present, all microservice platforms are composed of services which predominantly operate autonomously, or implicitly reinforce the anti-pattern of repetition.

The illustrative embodiments also recognize and take into account that microservice architectures are common among most larger technology organizations that offer software as a service (SaaS). Microservice architectures are becoming more prevalent as technologists come to realize the brittle nature of monolithic application programming interface (API) and service architecture patterns. These patterns suffer from a variety of problems addressed by distributed service models because of the nature of their design, such as a single point-of-failure.

Because of the commonality of knowledge and preference towards similar technology stacks and design patterns within organizations, often service oriented architectures share the same underlying, basic functionalities and libraries. However, service oriented architectures install them individually into each microservice. The shared code can be optimized to ship updates to all of the services at the same time, reducing the cost of upgrade. However, as long as the microservices that compose a platform are divided along lines of separate concerns or domains, the important content of each of the individual services will remain unique as is possible based on the differentiation in between microservice domains. Stated differently, each microservice within a software platform will have content that is unique and cannot be migrated or updated, even if they all use the same underlying technology.

The illustrative embodiments recognize and take into account that enforcing updates in this unique code can often be expensive, as the cost of making updates in a distributed system is at least the shortest time the change can be made in any of the distributed services multiplied by the number of services. This time is often in the tens or hundreds of hours of time spent applying the same change in different, but similar, contexts.

However, the illustrative embodiments address this issue by providing an architecture that allows all services to be migrated or updated in such a way that the time it takes to update the platform is at most the longest amount of time it takes for one service to update.

In particular, the illustrative embodiments accomplish this goal by using parsed or tokenized code tree traversal and stateful data migrations to create an entirely new technology used to migrate code that has not been traditionally migrated to improve the maintainability of code in micro serviced or distributed platforms. Specifically, the illustrative embodiments create a toolchain used to generate migrations, exposing a tangible set of matchers and filters allowing users to locate code constructs and codebase settings that the users may want to migrate.

In particular, the code will be parsed into an abstract syntax tree (AST). Based on the types of code constructs identified in the migration, the processor will traverse the abstract syntax tree and upon finding each relevant code construct, it will perform the operation defined in the migration itself. The application programming interface (API) that actually enables migration is different than that of the migration itself, but is exposed by the tool that creates the migration by the process outlined below in FIG. 1.

Then, the illustrative embodiments scaffold a deterministic script, which can be used to find instances of code to update or settings within an environment or repo to update. As used herein, the term "scaffolding" is defined as creating a script from a template. As used herein, the term "repo" refers to any source control mechanism (SCM) used in the process of tracking changes applied to the code itself, and may also refer to a source control repository. This process is mutually exclusive of the vehicle making the changed to the code.

The created tool exposes utilities for rolling forward by executing these scripts, rolling backward by tearing down these scripts, and maintaining a state of to where the consuming codebase has migrated at each point in time. Examples of these utilities includes a command line interface (CLI) tool, or a programmatic call to the tool itself, which may be synonymized with a "command". This command, or series of commands, could be used to "migrate forward", or using the known nomenclature for migrations states: "up", or migrate down, or using the known nomenclature for migration states: "roll backward". The actual medium the tool uses to expose this functionality may be secondary to an implementation that can be used at will by the consumer.

Attention is now turned to how the tool exposes the utilities. The exact technique used may be dependent on the technology used. For example, with respect to JAVASCRIPT®, in the course of creating a script that represents the migration ("Then, the illustrative embodiments scaffold a deterministic script, which can be used to find instances of code to update or settings within an environment or repo to update") the actual migration source code will scaffold functions which themselves will provide arguments that are the exact application programming interface (API) composed of the aforementioned utilities. In other languages, or other implementations of these scripts and/or migrations files, these utilities may have to be expressly imported.

The illustrative embodiments not only apply to services within an architecture, but also can be applied to the architecture itself, that is the platform which supports the services. Thus, not only the services can be updated with migrated code, but also the platform can be likewise updated with a single code migration. This feature can be accomplished by using a module to enable shared web services and server functionalities within the microservices that compose the platform.

A specific example is now provided, though this example may be generalized to other use cases. In this example, the illustrative embodiments create a set of migrations that look for code to update. A user can write a script on install into a core module of the architecture. In one non-limiting example, the script may be written in JAVA®. When written in JAVA®, the script can see what JAVA® files have already run inside a user code base.

In any case, the illustrative embodiments keep track of migrations that are run at a service level, and take the code at the service level to others. Thus, the illustrative embodiments can allow developers to take their functionality and serve it up as a web service. This result is possible because inside most or all services are the same underlying technology of microservices, such as node JS microservices, inside a web service that drives the functionality of the overall architecture.

FIG. 1 is an illustration of a flowchart of a method for enabling a computer to migrate microservices and to perform microservice templating, in accordance with an illustrative embodiment. Method 100 may be implemented in a data processing system, such as data processing system 300 of FIG. 3. Method 100 is a specific example of the principles of code migration described above.

Method 100 is divided into four layers which represent where or who a particular operation is performed. These layers include user input layer 101, command line interface or input layer 103, migration layer 105, and storage layer 107. A given operation takes place in a particular layer as shown in FIG. 1, though the order of operations does not necessarily depend on the layers themselves, and vice versa.

Method 100 may begin with a user creating a migration (operation 102). A migration is a specification which defines an identity of the code to be migrated, how the code is to be migrated, and possibly conditions of migration.

Creating, or alternatively defining, a migration may be implemented via the use of a computer. The computer receives input specifying the code to be updated and how the code is to be updated. The user may specifically use a command line interface (CLI) to create the migration (operation 104). However, other input means may be used. During operation 104 the command line interface provides the means necessary for the user to consume the API by exposing it during the process of creating the migration (operation 106).

From the above, it will be recognized that the process of creating the migration requires a computer, and cannot be performed by a human, even though a human user drives the initiation and specification of the illustrative embodiments. In some instances, the migration may be entirely computer defined, such as when a computer is instructed to automatically migrate code under certain conditions. Accordingly, in some illustrative embodiments the user is needed to create the migration, but in other illustrative embodiments it is possible for the entirety of method 100 to be performed solely by a computer.

In any case, the result of creating a migration at operation 104 is the exporting of the migration (operation 108). Optionally, the user may consume the application programming interface (operation 110).

Method 100 then tracks the migrations in a source control mechanism or stores the migration at a local migration store (operation 112). If necessary, the migration is then exported again (operation 114). A determination is made if operation 114 is to remain local storage (operation 116). If not necessary, migration may be stored in more permanent storage (operation 118). This same determination at operation 116 is also made if the user directly specifies the migration at operation 120 and performs the migration at operation 122.

Next, a determination is made whether there is a pending migration (operation 124). If not, then the method proceeds to operation 130. However, if so, then migration is called (operation 126) from local data store (operation 128).

The processor then calls the migration via the application programming interface (API) (operation 130). Optionally, service code may be provided as part of this operation (operation 132). The calling of the migration via the application programming interface (API) at operation 130 effectively migrates the code or updates the state of the existing code (operation 134). In other words, the migration itself is executed, which calls the API which is used in the course of the user definition of the migration. In one illustrative embodiment, the method may terminate thereafter.

Method 100 may be varied. Method 100 may include more or fewer operations. The operations described with respect to FIG. 1 may be varied from those shown. Thus, the illustrative embodiments are not necessarily limited by the example provided in FIG. 1.

Figure 2:
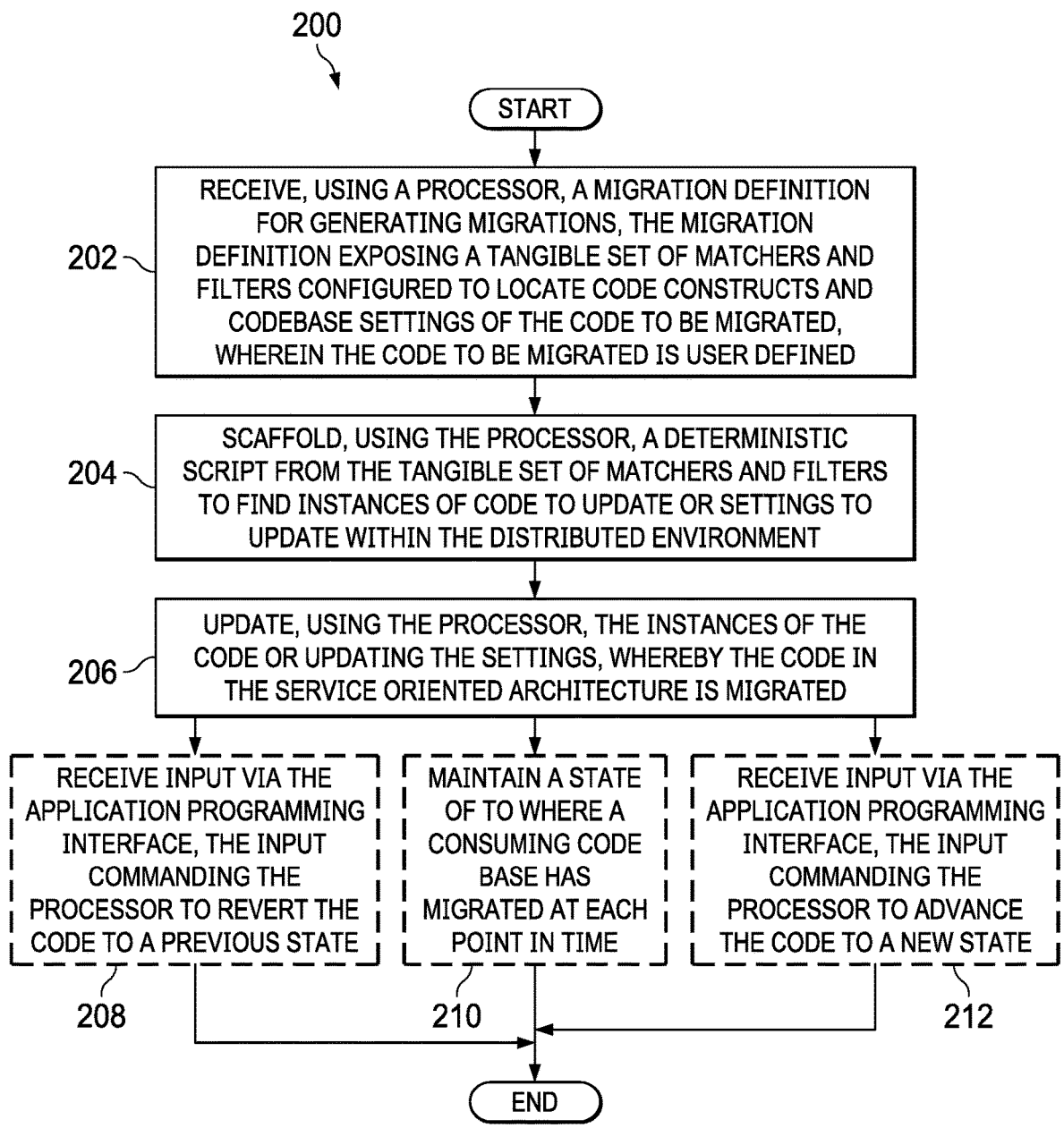
FIG. 2 is an illustration of a flowchart of a computer implemented method of enabling migration of code in a service oriented architecture executed in a distributed computing environment, in accordance with an illustrative embodiment.

FIG. 2 is an illustration of a flowchart of a computer-implemented method of enabling migration of code in a service oriented architecture executed in a distributed computing environment, in accordance with an illustrative embodiment. Method 200 may be characterized as a computer implemented method of enabling migration of code in a service oriented architecture executed in a distributed computing environment. Method 200 may be implemented using a data processing system, such as data processing system 300 of FIG. 3. Method 200 is a variation of method 100 of FIG. 1.

Method 200 begins with receiving, using a processor, a migration definition for generating migrations, the migration definition exposing a tangible set of matchers and filters configured to locate code constructs and codebase settings of the code to be migrated, wherein the code to be migrated is user defined (operation 202). The code to be migrated can be specifically designated using the previously defined matchers and filters.

In one illustrative embodiment, the matchers and filters may be the application programming interface (API). However, the API could refer to any mechanism that allows the user to define what code they would like to target in the execution of a given migration. For the illustrative embodiments described herein, we have two described: matchers and filters. "Matchers" refer to an API which finds code based on its abstract syntax tree (AST) type, or after being parsed and tokenized by any compiler, a mechanism which allows one to match against particular code constructs. "Filters" are a different mechanism, referring to a text-based approach. An example of a filter would be a pattern matcher strategy, whereby either a string of text or a regular expression was used to match explicit phrases of code and change them to a new state.

There are potentially many other strategies for deciding which code should be updated by any given migration. For example, the system could perform static analysis on the types of inputs which functions expect and the types of the expected return values and determine that any function $f(x)=y$ should be migrated such that $f(x=>x')=y=>y'$. Or, in other words, a migration to manipulate the body of the function, or wrap the function, so that the actual types returned by the function are mutated. In a similar example, but not necessarily static analysis, the system could partially execute any code such that the output values of a function are obtained and then determine whether a migration should be performed based on the actual values yielded from a given set of input parameters. This technique is usually referred to as "pre-packing."

Thus, while the initially claimed use of matchers and filters does not define the limitations of the API, these examples are a little less difficult to build and a little clearer to the user than last two examples, in terms of usefulness. In the cases for the technology described herein, one would not likely encounter many cases where the last two examples were useful. However, the API itself could be expanded to expose as many options as there are viable ways to find specific parts of code.

Method 200 also includes scaffolding, using the processor, a deterministic script from the tangible set of matchers and filters to find instances of code to update or settings to update within the distributed environment (operation 204). Method 200 also includes updating, using the processor, the instances of the code or updating the settings, whereby the code in the service oriented architecture is migrated (operation 206). In one illustrative embodiment, the method may terminate thereafter.

Method 200 may be varied or expanded. For example, the migration definition may expose an application programming interface which the user can use to define migration of the code.

In an example of expanding method 200, method 200 optionally may also include receiving input via the application programming interface, the input commanding the processor to revert the code to a previous state (operation 208). In another example of expanding method 200, method 200 optionally may also include maintaining a state of to where a consuming code base has migrated at each point in time (operation 210). In another example of expanding method 200, method 200 optionally may also include receiving input via the application programming interface, the input commanding the processor to advance the code to a new state (operation 212). Operation 208, operation 210, and operation 212 may be mutually exclusive of each other. In any case, after these operations, method 200 may terminate thereafter.

Method 200 may be varied further still. For example, in an illustrative embodiment, updating is performed by using a parsed or tokenized code tree traversal to traverse code to be migrated. In another illustrative embodiment, the deterministic script is scaffolded based on the matchers and filters.

Still other variations are possible. For example, the illustrative embodiments may also include a non-transitory computer-recordable storage medium storing program code which, when executed by a processor, performs method 200. In another example, the illustrative embodiments also include a computer configured to perform method 200.

Thus, the illustrative embodiments described with respect to FIG. 2 do not necessarily limit the claimed inventions or other examples described herein.

Figure 3:
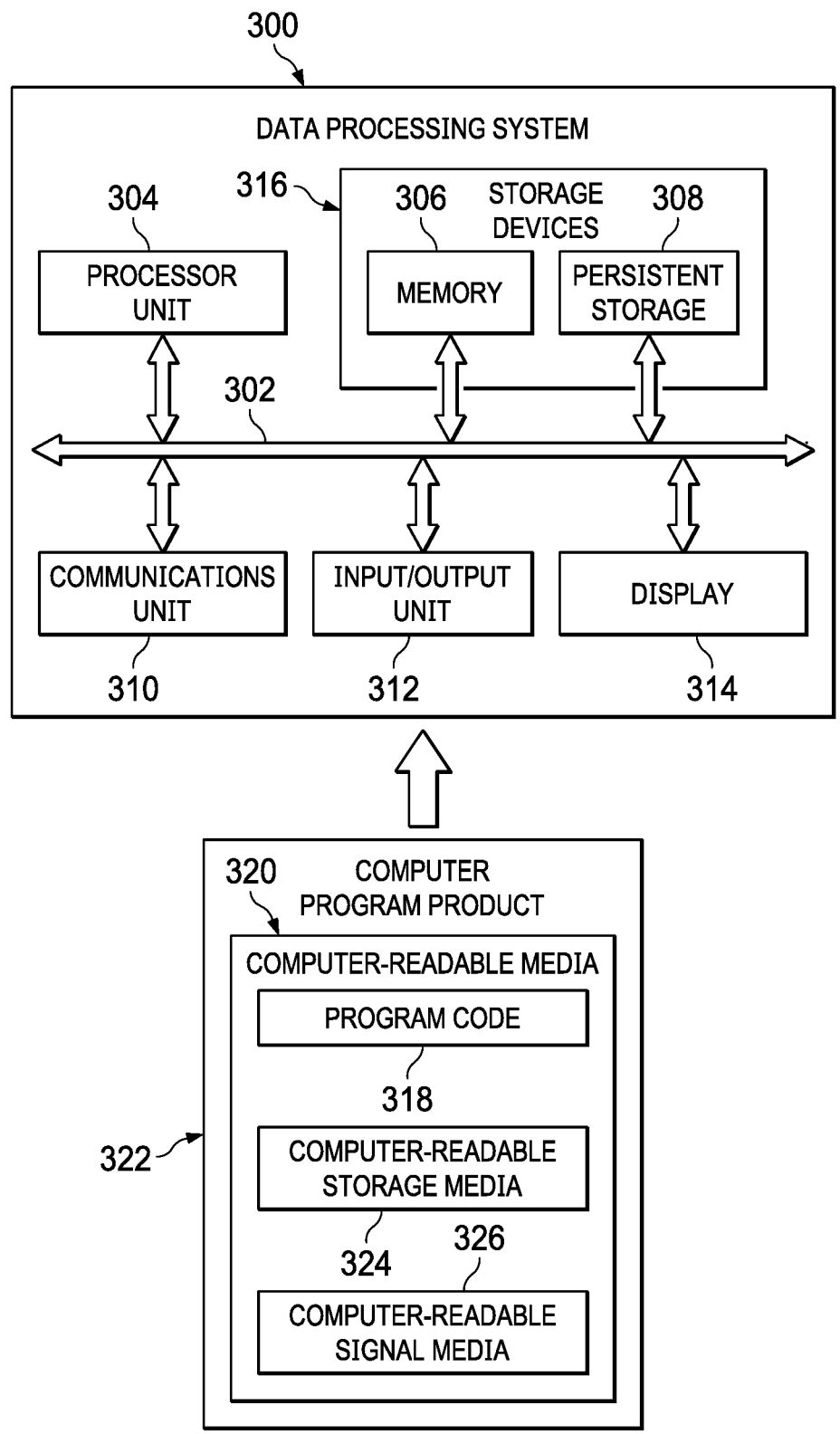
FIG. 3 is a block diagram of a data processing system in accordance with an illustrative embodiment.

FIG. 3 is a block diagram of a data processing system depicted in accordance with an illustrative embodiment. Data processing system 300 is an example of a computer that may be used to implement any of the illustrative embodiments described with respect to FIG. 1 through FIG. 14.

In this illustrative example, data processing system 300 includes communications framework 302, which provides communications between processor unit 304, memory 306, persistent storage 308, communications unit 310, input/output unit 312, and display 314. In this example, communication framework 302 may take the form of a bus system.

Processor unit 304 serves to execute instructions for software that may be loaded into memory 306. Processor unit 304 may be a number of processors, a multi-processor core, or some other type of processor, depending on the particular implementation.

Memory 306 and persistent storage 308 are examples of storage devices 316. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be the software on a non-transitory computer-recordable storage medium usable to implement any of the illustrative embodiments described above. Storage devices 316 may also be referred to as computer-readable storage devices in these illustrative examples. Memory 306, in these examples, may be, for example, a random access memory or any other suitable volatile or non-volatile storage device. Persistent storage 308 may take various forms, depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these illustrative examples, provides for communications with other data processing systems or devices. In these illustrative examples, communications unit 310 is a network interface card.

Input/output unit 312 allows for input and output of data with other devices that may be connected to data processing system 300. For example, input/output unit 312 may provide a connection for user input through at least of a keyboard, a mouse, or some other suitable input device. Further, input/output unit 312 may send output to a printer. Display 314 provides a mechanism to display information to a user.

Instructions for at least one of the operating system, applications, or programs may be located in storage devices 316, which are in communication with processor unit 304 through communications framework 302. The processes of the different embodiments may be performed by processor unit 304 using computer-implemented instructions, which may be located in a memory, such as memory 306.

These instructions are referred to as program code, computer-usable program code, or computer-readable program code that may be read and executed by a processor in processor unit 304. The program code in the different embodiments may be embodied on different physical or computer-readable storage media, such as memory 306 or persistent storage 308.

Program code 318 is located in a functional form on computer-readable media 320 that is selectively removable and may be loaded onto or transferred to data processing system 300 for execution by processor unit 304. Program code 318 and computer-readable media 320 form computer program product 322 in these illustrative examples. In one example, computer-readable media 320 may be computer-readable storage media 324 or computer-readable signal media 326.

In these illustrative examples, computer-readable storage media 324 is a physical or tangible storage device used to store program code 318 rather than a medium that propagates or transmits program code 318.

Alternatively, program code 318 may be transferred to data processing system 300 using computer-readable signal media 326. Computer-readable signal media 326 may be, for example, a propagated data signal containing program code 318. For example, computer-readable signal media 326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 300 are not meant to provide architectural limitations to the manner in which different embodiments may be implemented. The different illustrative embodiments may be implemented in a data processing system including components, in addition to or in place of those illustrated, for data processing system 300. Other components shown in FIG. 3 can be varied from the illustrative examples shown. The different embodiments may be implemented using any hardware device or system capable of running program code 318.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

As used herein, the term "server" or "server computer" is any computer which operates in the role of a server, whether or not the computer is configured specifically to operate as a "server." As used herein, the term "client" or "client computer" is any computer which operates in the roll of a client, whether or not the computer is configured specifically to operate as a "client" or a "workstation."

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    migrating executable program code in a service oriented architecture executed in a distributed computing environment by a processor comprising:
        receiving a migration definition for generating migrations, the migration definition exposing a tangible set of matchers and filters configured to locate code constructs and codebase settings of the executable code to be migrated, wherein the executable program code to be migrated is defined by a user;
        scaffolding a deterministic script from a template based on the tangible set of matchers and filters to find instances of code to update or settings to update within the distributed computing environment; and
        updating the instances of code or updating the settings, wherein updating is performed by using a parsed or tokenized code tree traversal and stateful data migrations to migrate code to be migrated, wherein updating consumes updates maintained in a centralized repository; and independently tracks its own upgraded state,
    wherein stateful data migrations include a toolchain.

2. The method of claim 1, wherein the migration definition exposes an application programming interface which is used to define migration of the executable code.

3. The method of claim 1, further comprising the processor:
    receiving input via the application programming interface, the input commanding the processor to revert the executable code to a previous state.

4. The method of claim 1 further comprising the processor:
    receiving input via the application programming interface, the input commanding the processor to advance the executable code to a new state.

5. The method of claim 3, further comprising the processor:
    maintaining a state of to where a consuming code base has migrated at each point in time.

6. The method of claim 1, wherein the deterministic script is scaffolded based on a user's consumption of an application programming interface and definition of the tangible set of matchers and filters.

7. The method of claim h further comprising the processor:
    maintaining a state of to where a consuming code base has migrated at each point in time.

8. A computer program product, comprising:
    a computer-readable storage media comprising instructions which, when executed by a processor, migrates code in a service oriented architecture executed in a distributed computing environment, wherein the code in the service oriented architecture comprises executable program code to be migrated, the instructions comprising:
        first program code for receiving a migration definition for generating migrations, the migration definition exposing a tangible set of matchers and filters configured to locate code constructs and codebase settings of the code to be migrated, wherein the executable program code to be migrated is defined by a user;
        second program code for scaffolding a deterministic script from a template based on the tangible set of matchers and filters to find instances of code to update or settings to update within the distributed computing environment; and
        third program code for updating the instances of code or updating the settings, wherein updating is performed by using a parsed or tokenized code tree traversal and stateful data migrations to migrate code to be migrated, wherein updating consumes updates maintained in a centralized repository and independently tracks its own upgraded state
    wherein stateful data migrations include a toolchain.

9. The computer program product of claim 8, wherein the migration definition is configured to expose an application programming interface which is used to define migration of the code.

10. The computer program product of claim 8, wherein the instructions further comprise:
    fourth program code for receiving input via an application programming interface, the input configured to command the processor to revert the code to a previous state.

11. The computer program product of claim 8, wherein the instructions further comprise:
    fourth program code for receiving input via an application programming interface, the input configured to command the processor to advance the code to a new state.

12. The computer program product of claim 10, wherein the instructions further comprise:
    fourth program code for maintaining a state of to where a consuming code base has migrated at each point in time.

13. The computer program product of claim 8, wherein the deterministic script is scaffolded based on a user's consumption of an application programming interface and definition of the tangible set of matchers and filters.

14. The computer program product of claim 8, wherein the instructions further comprise:
    fourth program code for maintaining a state of to where a consuming code base has migrated at each point in time.

15. A computing device comprising:
    a processor; and
    a computer-readable storage media comprising instructions which, when executed by the processor, migrates code in a service oriented architecture executed in a distributed computing environment, wherein the code in the service oriented architecture includes executable program code to be migrated, the instructions comprising:
        first program code for receiving a migration definition for generating migrations, the migration definition exposing a tangible set of matchers and filters configured to locate code constructs and codebase settings of the code to be migrated, wherein the executable program code to be migrated is user defined;
        second program code for scaffolding a deterministic script from a template based on the tangible set of matchers and filters to find instances of code to update or settings to update within the distributed computing environment; and third program code for updating the instances of code or updating the settings, wherein updating is performed by using a parsed or tokenized code tree traversal and stateful data migrations to migrate code to be migrated, wherein updating consumes updates maintained in a centralized repository and independently tracks its own upgraded state wherein stateful data migrations include a toolchain.

16. The computing device of claim 15, wherein the instructions further comprise:

fourth program code for receiving input via an application programming interface, the input commanding the processor to revert the code to a previous state.

17. The computing device of claim 15, wherein the instructions further comprise:

fourth program code for receiving input via an application programming interface, the input commanding the processor to advance the code to a new state.

18. The computing device of claim 16, wherein the instructions further comprise:

fifth program code for maintaining a state of to where a consuming code base has migrated at each point in time.

19. The computing device of claim 15, wherein the deterministic script is scaffolded based on a user's consumption of an application programming interface and definition of the tangible set of matchers and filters.

20. The computing device of claim 15, wherein the instructions further comprise:

fourth program code for maintaining a state of to where a consuming code base has migrated at each point in time.

21. The computing device of claim 15, wherein the migration definition is configured to expose an application programming interface which is used to define migration of the code.

* * * * *